(12) United States Patent
Su

(10) Patent No.: US 7,034,805 B2
(45) Date of Patent: Apr. 25, 2006

(54) OPTICAL TRACKBALL

(75) Inventor: Yu-Quan Su, Taipei Hsien (TW)

(73) Assignee: Kye Systems Corp., Taipei Hsein (TW)

( * ) Notice: Subject to any disclaimer, the term of this patent is extended or adjusted under 35 U.S.C. 154(b) by 349 days.

(21) Appl. No.: 09/985,339

(22) Filed: Nov. 2, 2001

(65) Prior Publication Data

US 2003/0085876 A1 May 8, 2003

(51) Int. Cl.
*G09G 5/08* (2006.01)
*H01J 40/14* (2006.01)

(52) U.S. Cl. ........................................ 345/165; 250/221
(58) Field of Classification Search ......... 345/163–167; 250/221, 203.2–203.3, 202, 548, 559.29, 250/206.1
See application file for complete search history.

(56) References Cited

U.S. PATENT DOCUMENTS

| | | | | |
|---|---|---|---|---|
| 4,794,384 A | * | 12/1988 | Jackson | 345/166 |
| 5,027,115 A | * | 6/1991 | Sato et al. | 341/13 |
| 5,288,993 A | * | 2/1994 | Bidiville et al. | 250/221 |
| 5,635,956 A | * | 6/1997 | Tak | 345/163 |
| 5,644,139 A | * | 7/1997 | Allen | 250/557 |
| 5,703,356 A | * | 12/1997 | Bidiville et al. | 250/221 |
| 6,172,665 B1 | * | 1/2001 | Bullister | 345/163 |
| 6,303,924 B1 | * | 10/2001 | Adan et al. | 250/221 |
| 6,529,184 B1 | * | 3/2003 | Julienne | 345/157 |
| 6,586,720 B1 | * | 7/2003 | Hu | 250/221 |

* cited by examiner

Primary Examiner—Dennis-Doon Chow
Assistant Examiner—Leland R. Jorgensen
(74) Attorney, Agent, or Firm—Bacon & Thomas, PLLC

(57) ABSTRACT

An optical trackball is disclosed that is easy to operate without been worried about the contamination on the contacting shifts of encoders inside the trackball. When a distal motion from a user to rotate an operating ball having an uneven surface on the trackball, an image-detecting module will detect the varying of the reflected image from an illuminated portion of the uneven surface, causing the correspondingly moving of the cursor on the computer display.

10 Claims, 4 Drawing Sheets

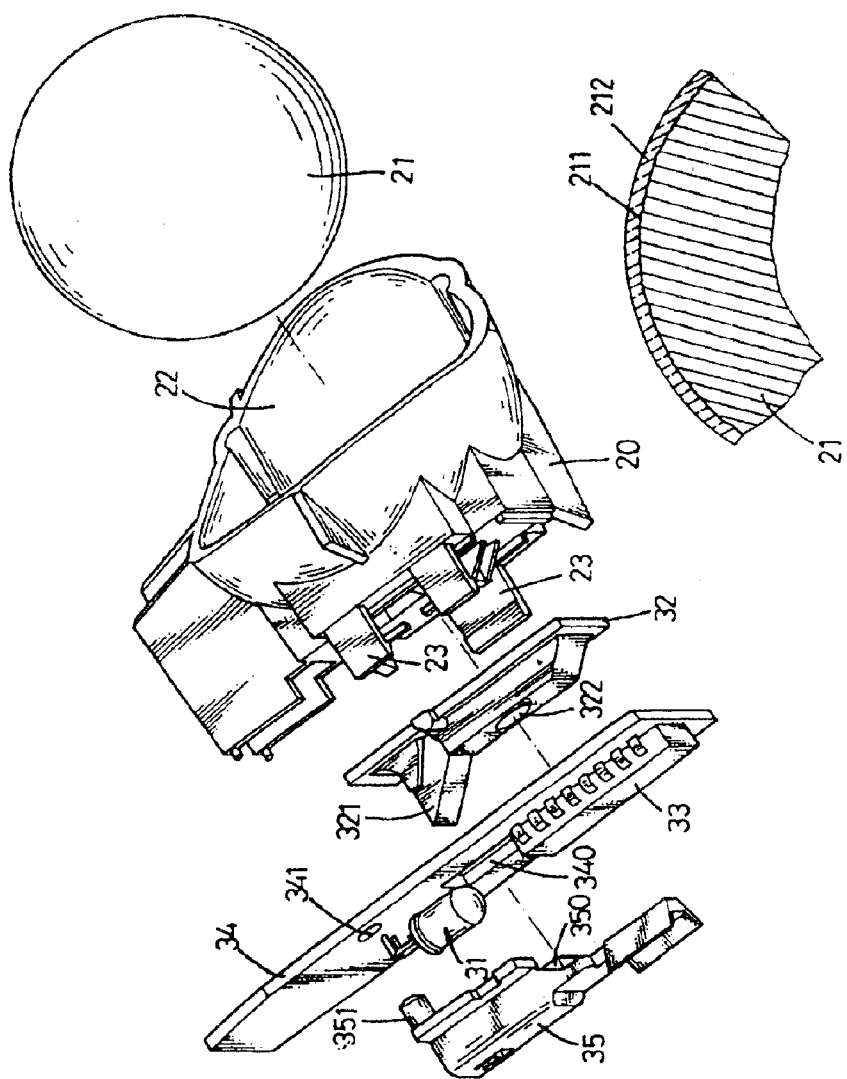

OPTICAL TRACKBALL

FIELD OF THE INVENTION

The present invention relates to an optical trackball, particularly to that have an operating ball with an uneven surface thereon.

BACKGROUND OF THE INVENTION

A conventional computer trackball uses an operating ball mechanically contacted with axles having wheels respectively to translate motions of the operating ball into signals on a coordinate of a cursor on a display of a computer.

Contamination on the surface of the operating ball from dirt or greasiness via the distal motion of a user, however, certainly will affect the moving of the cursor on the display abnormally. Therefore, the user has to clean the operating ball and connecting axles quite often. Not to mention about the surface being worn a bit.

It is known an optical trackball with speckles on the surface of the operating ball according to the U.S. Pat. No. 5,288,993, where the speckles have to be placed in a certain density, and also the color of the speckles has to contrast with the background color of the operating ball. Thus the cost to produce such an operating ball with speckles is quite high, and the procedure must be under precisely controlled when making the speckles upon the operating ball.

SUMMARY OF THE INVENTION

The primary object of the present invention is to provide a trackball which enables its operating ball to be anti-contamination.

Another object of the present invention is to provide a trackball has a lower cost to produce its operating ball.

The trackball to achieve the objects mentioned above, comprising a body and an operating ball; an image-detecting module within the body; wherein the operating ball has an uneven surface thereon, illuminated by a light source on a portion of the operating ball to generate a reflected image through the image-detecting module; a user uses a distal motion to rotate the operating ball to generate a varying of the reflected image; the image-detecting module compares the varying as to enable a cursor on a computer display to move correspondingly.

The various objects and advantages of the present invention will be more readily understood from the following detailed description when read in conjunction with the appended drawing.

BRIEF DESCRIPTION OF THE DRAWINGS

FIG. 2 is sectional view of an operating ball of the trackball

FIG. 3 is an exploded view of the trackball.

DETAILED DESCRIPTION OF THE PREFERRED EMBODIMENTS

Figure 1:
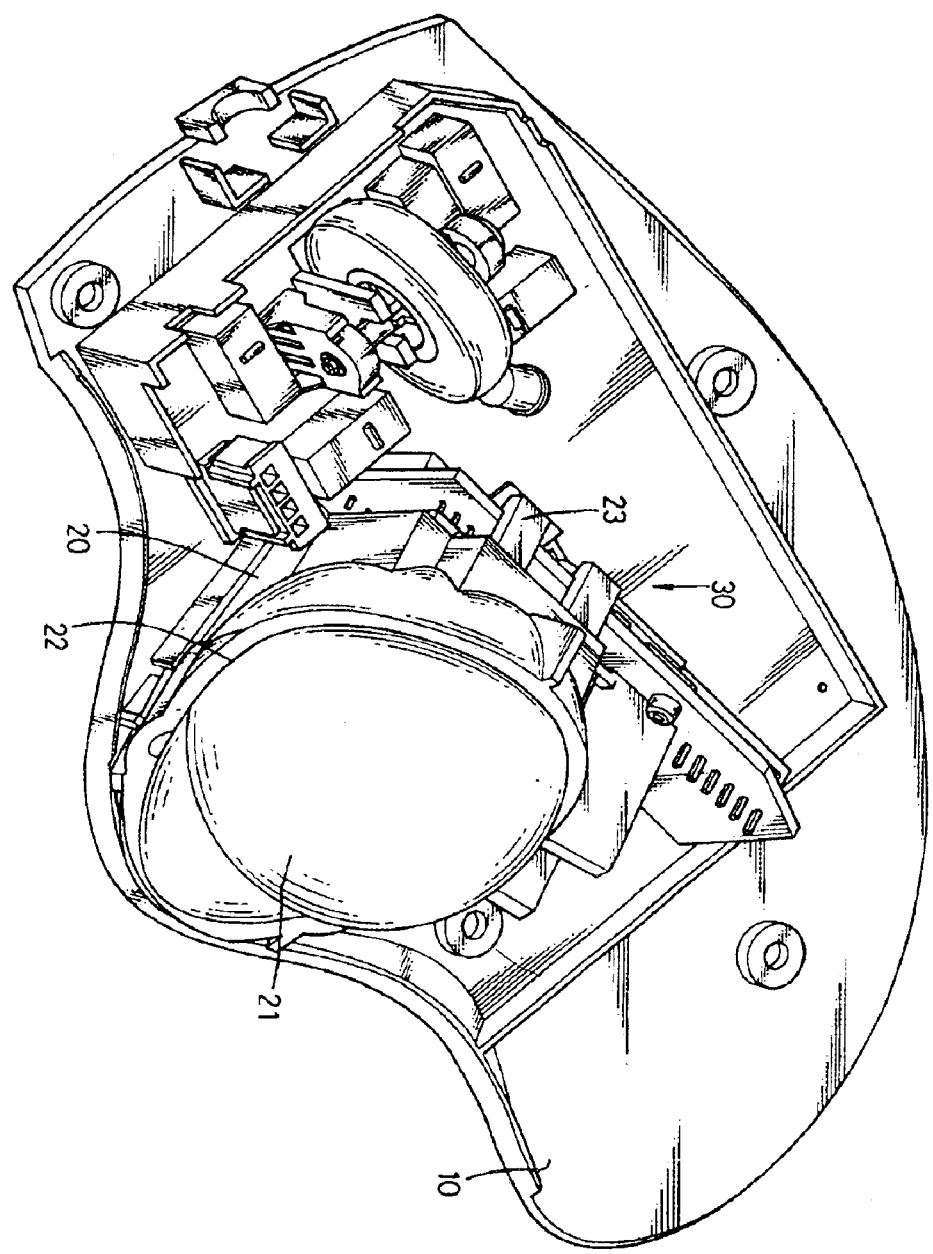
FIG. 1 is a perspective view of an optical trackball according to the present invention.

The present invention relates to a trackball shown in FIG. 1, including a body 10 having a ball cage 20 thereon to contain an operating ball 21 therein. An image-detecting module 30 is coupled to the ball cage 20, facing the operating ball 21 which has an uneven surface thereon. A transparent protective layer 212 in FIG. 2 covers the uneven surface 211 such that the uneven surface 211 can be protected from wear; and to allow the uneven surface 211 to be illuminated directly without any obstacle. The phrase uneven surface 211 as recited here means a surface having a roughness attributable to an intrinsic texture of the material from which the ball is made, i.e., high and low portions or roughness of the material itself. This is alternative to an arrangement on the surface that will cause the rotation of the operating ball to be detected, using multilayer stripes, threads, marble-like-patterns, or multilayer patterns.

Figure 4:
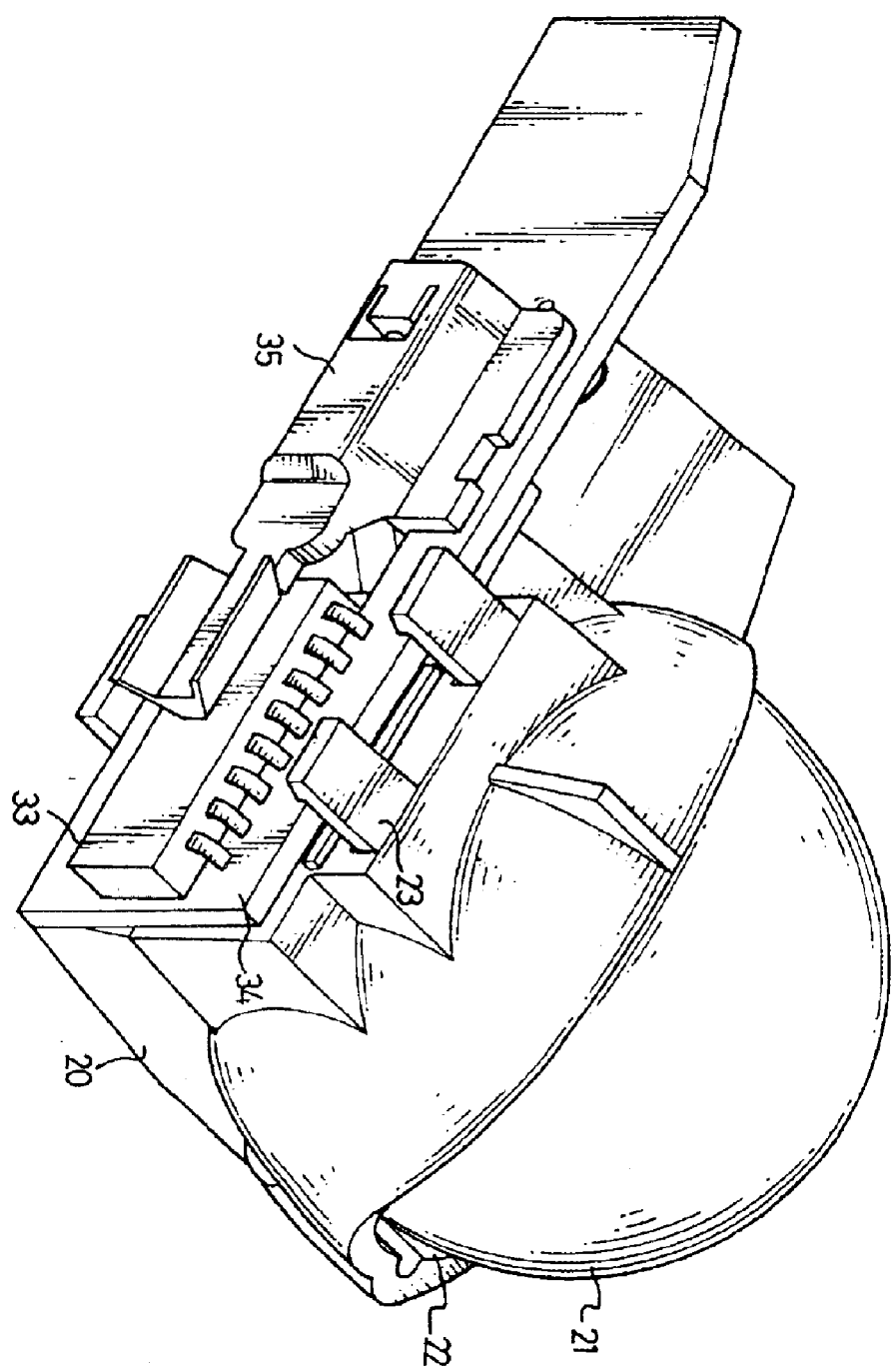
FIG. 4 is assembly view of FIG. 3.
Figure 5:
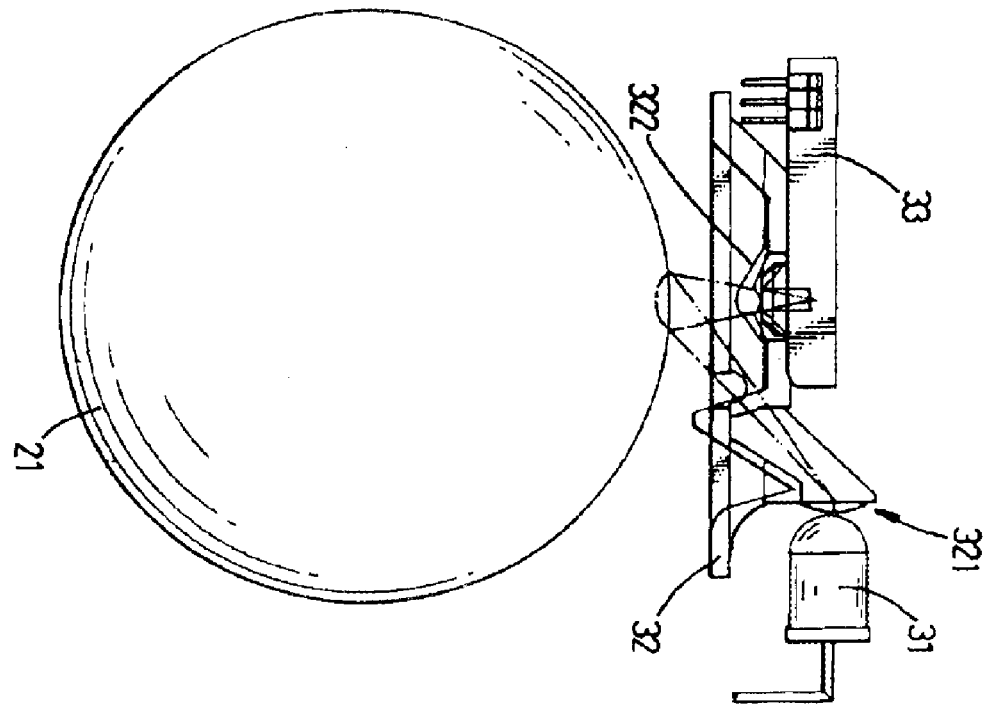
FIG. 5 is a view for the working principle according to the optical trackball.

Please refer to FIGS. 3-5. The ball cage 20 has a chamber 22 for containing the operating ball 21. The ball cage 20 has an opening (not shown) where the clippers 23 are provided around to secure the image-detecting module 30 and a light source 31 (Light Emitting Diode or the like). The module 30 includes a lenses unit 32 and a sensor 33, where the light emitted from the light source 31 will be focused on a portion of the uneven surface 211, and reflected to the sensor 33. The lenses unit 32 includes an incident lens 321 at one end, and a focusing lens 322 at another. However, the light emitted from the light source 31 will be inclined-and-focused on a portion of the uneven surface 211 through the incident lens 321, and upwardly reflected to the sensor 33 through a focusing lens 322 onto the sensor 33, as shown in FIG. 5.

The light source 31 and the sensor 33 is coupled to a plate 34, where a rectangular opening 340 on the plate 34 allows the insertion of the incident lens 321 for receiving the light emitted from the light source 31 that causes the focusing lens 322 is just beneath the sensor 33. However, a positioning plate 35 has a recess portion 350 for receiving the light source 31 therein. A pillar 351 near the recess portion 350 is coupled to the hole 341 of the plate 34. Therefore, the image-detecting module 30 is secured between the positioning plate 35 and the ball cage 20.

Please refer to FIG. 5. A portion of the uneven surface 211 of the operating ball 21 will be illuminated by the light source 31 through the incident lens 321, and the uneven surface 211 will upwardly reflect the image (the illuminated portion) through the focusing lens 322 onto the sensor 33 at a first position.

When a user rotates the operating 21, the sensor 33 will detect and compare the varying of a new illuminated image in a second position, causing a cursor on a computer display will move correspondingly. Please be noticed that the relative technique to detect the varying of an image can be found and cited from U.S. Pat. No. 5,644,139. Therefore, the specification of the present invention won't further discuss the known skill hereinafter.

The present invention are thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An improvement for a trackball, comprising:
   a body, an operating ball, a light source, and an image-detecting module therein;
   wherein the operating ball is made of a material having a surface thereon, said surface having a roughness attributable to a texture of said material itself, wherein when the surface is illuminated by the light source and the ball is rotated by a user, the image detecting module detects variations in said surface resulting from said roughness attributable to the intrinsic texture of said material in order to detect movement of the ball so as to enable a cursor on a computer display to move correspondingly.

2. The track ball as claimed in claim 1, wherein the surface further has a transparent-protecting layer thereon.

3. The trackball as claimed in claim 1, wherein the image-detecting module includes a lens unit to focus a light emitted from the light source and the reflected image onto a sensor.

4. The trackball as claimed in claim 3, wherein the lens unit includes an incident lens located between the operating ball and the light source; and a focusing lens that focuses the reflected image onto the sensor.

5. The trackball as claimed in claim 4, wherein the light source and the sensor are coupled to a plate, and the incident lens is located between the sensor and the light source.

6. The trackball as claimed in claim 5, wherein a positioning plate is securely mounted upon the sensor and the light source.

7. The trackball as claimed in claim 6, wherein a portion of the positioning plate is fixed to the plate.

8. The trackball as claimed in claim 7, wherein the plate is coupled to a ball cage of the body.

9. The trackball as claimed in claim 1, wherein the light source is a light emitting diode.

10. A method for controlling a cursor moving on a computer display through a trackball, comprising the steps of:

a user rotating an operating ball on the trackball, the operating ball having a surface with a roughness attributable to an intrinsic texture of a material from which the operating ball is made;

detecting variations in a reflected image from an illuminated portion of the-surface via an image-detecting module, said detecting variations resulting from said roughness attributable to said intrinsic texture of said material of said operating ball;

enabling moving of the cursor on the computer display correspondingly.

* * * * *